(12) United States Patent
Mochida

(10) Patent No.: US 11,099,429 B2
(45) Date of Patent: Aug. 24, 2021

(54) SURFACE LIGHT SOURCE DEVICE AND DISPLAY DEVICE

(71) Applicant: Enplas Corporation, Kawaguchi (JP)

(72) Inventor: Toshihiko Mochida, Saitama (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 17/093,766

(22) Filed: Nov. 10, 2020

(65) Prior Publication Data
US 2021/0141273 A1   May 13, 2021

(30) Foreign Application Priority Data
Nov. 12, 2019  (JP) ............................. JP2019-204919

(51) Int. Cl.
  *G02F 1/00*    (2006.01)
  *G02F 1/13357* (2006.01)

(52) U.S. Cl.
  CPC .. *G02F 1/133606* (2013.01); *G02F 1/133603* (2013.01)

(58) Field of Classification Search
  CPC ......... G02F 1/133606; G02F 1/07; G02F 1/03
  See application file for complete search history.

(56) References Cited

U.S. PATENT DOCUMENTS

| | | | | | |
|---|---|---|---|---|---|
| 6,167,182 A | * | 12/2000 | Shinohara | ............ | G02B 6/0036 385/129 |
| 7,366,392 B2 | * | 4/2008 | Honma | ................ | G02B 6/0048 385/146 |
| 2008/0094853 A1 | * | 4/2008 | Kim | ..................... | G02B 6/0068 362/612 |
| 2011/0051044 A1 | * | 3/2011 | Segawa | ................ | G02B 5/0278 349/64 |
| 2013/0033901 A1 | * | 2/2013 | Nishitani | ............. | G02B 6/0036 362/613 |
| 2013/0242613 A1 | * | 9/2013 | Kurata | ................. | G02B 6/0035 362/613 |
| 2013/0322111 A1 | * | 12/2013 | Nishitani | ............. | G02B 6/0028 362/603 |

FOREIGN PATENT DOCUMENTS

| | | | | |
|---|---|---|---|---|
| JP | 2013-191514 | | 9/2013 | |
| JP | 2013191514 A | * | 9/2013 | ........... G02B 6/0036 |

* cited by examiner

*Primary Examiner* — Gerald J Sufleta, II
(74) *Attorney, Agent, or Firm* — Amin, Turocy & Watson, LLP

(57) ABSTRACT

A surface light source device includes a substrate, a plurality of light emitting devices and a light diffusion plate. Each light emitting device includes a light emitting element and a light flux controlling member. A cross section, perpendicular to the central axis of the light flux controlling member, of the emission surface is line-symmetric with respect to the X-axis and the Y-axis, and the cross section has the shortest length along the X-axis and the longest length along the Y-axis. For the light flux controlling member of one of the light emitting devices that is disposed closest to a corner of the light diffusion plate in plan view, a part having a largest curvature in the emission surface on the cross section of the emission surface is located closer to the X-axis than an intersection point of a light beam with the emission surface is.

3 Claims, 14 Drawing Sheets

SURFACE LIGHT SOURCE DEVICE AND DISPLAY DEVICE

CROSS REFERENCE TO RELATED APPLICATIONS

This application is entitled to and claims the benefit of Japanese Patent Application No. 2019-204919, filed on Nov. 12, 2019, the disclosure of which including the specification, drawings and abstract is incorporated herein by reference in its entirety.

TECHNICAL FIELD

The present invention relates to a surface light source device including a light flux controlling member that controls the distribution of light emitted from a light emitting element, and a display device including the surface light source device.

BACKGROUND ART

Some transmitting image display devices such as liquid crystal display devices use a direct surface light source device as a backlight. In recent years, a direct surface light source device including a plurality of light emitting elements as its light source is used.

Such a direct surface light source device includes, for example, a substrate, a plurality of light emitting devices, and a light diffusion plate. The plurality of light emitting devices are arranged in a matrix on the substrate. Each light emitting device includes a light emitting element, and a light flux controlling member that expands light emitted from the light emitting element in the planar direction of the substrate. Light emitted from the plurality of light emitting devices is diffused by the light diffusion plate to illuminate a member to be irradiated (for example, liquid crystal panel) in a planar shape. FIG. 1 illustrates an interior of surface light source device 100 including a plurality of light emitting devices 200 arranged in a matrix on a substrate as described in Patent Literature (hereinafter, referred to as PTL) 1.

CITATION LIST

Patent Literature

PTL 1
Japanese Patent Application Laid-Open No. 2013-191514

SUMMARY OF INVENTION

Technical Problem

The surface light source device 100 shown in FIG. 1 includes light emitting devices 200 spaced at not constant intervals in the X-axis direction (including the interval between light emitting device 200 and the end of the light diffusion plate) and in the Y-axis direction (including the interval between light emitting device 200 and the end of the light diffusion plate), when viewed in plan view. In some cases, however, light emitting devices 200 are spaced at constant intervals in the X-axis direction, and also in the Y-axis direction. In such a case, light emitting device 200 may be spaced apart at the intervals in the X-axis direction different from the intervals in the Y-axis direction. When the intervals between light emitting devices 200 in the X-axis direction are shorter than the intervals between light emitting devices 200 in the Y-axis direction, for example, light emitted from light emitting devices 200 does not sufficiently reach the corners of the light diffusion plate of surface light source device 100, and luminance unevenness may occur.

The present invention has been made in view of the above circumstances, and an object of the present invention is to provide a surface light source device capable of reducing the occurrence of luminance unevenness at the corners of a light diffusion plate even when the intervals between light emitting devices in the X-axis direction are different from the intervals between the light emitting devices in the Y-axis direction, and a display device including the surface light source device.

Solution to Problem

A surface light source device of the present invention includes: a substrate; a plurality of light emitting devices disposed on the substrate; and a light diffusion plate that allows light from the plurality of light emitting devices to pass through while diffusing the light, the light diffusion plate having a substantially rectangular shape and being disposed so as to face the substrate, in which: each of the plurality of light emitting devices includes a light emitting element, and light flux controlling member that controls distribution of light emitted from the light emitting element; the light flux controlling member includes an incidence surface disposed so as to face the light emitting element, and an emission surface disposed so as to face the light diffusion plate; a cross section of the emission surface is line-symmetric with respect to an X-axis and a Y-axis orthogonal to the X-axis, the cross section having a shortest length in a direction along the X-axis and a longest length in a direction along the Y-axis, the cross section being perpendicular to a central axis of the light flux controlling member; the light flux controlling member of one of the plurality of light emitting devices, the one light emitting device being disposed closest to a corner of the light diffusion plate, is disposed in plan view in such a way that: two sides of four sides of the light diffusion plate are substantially parallel to the X-axis, the two sides facing each other, and another two sides of the four sides of the light diffusion plate are substantially parallel to the Y-axis, the other two sides facing each other, and a shortest distance from the light flux controlling member to a virtual plane which is orthogonal to the Y-axis passing through the corner is longer than a shortest distance from the light flux controlling member to a virtual plane which is orthogonal to the X-axis passing through the corner; and for the one light emitting device disposed closest to the corner of the light diffusion plate, a part having a largest curvature in the emission surface on the cross section of the emission surface is located closer to the X-axis than an intersection point of a light beam with the emission surface is, the light beam being emitted from a light emission center of the light emitting element and reaching the corner of the light diffusion plate, the cross section passing through the intersection point and being perpendicular to the central axis.

A display device of the present invention includes the surface light source device of the present invention, and a display member to be irradiated with light emitted from the surface light source device.

Advantageous Effects of Invention

The present invention can provide a surface light source device capable of reducing the occurrence of luminance unevenness at the corners of a light diffusion plate even when the intervals between light emitting devices in the X-axis direction are different from the intervals between the light emitting devices in the Y-axis direction. The present invention can also provide a display device including the surface light source device.

DESCRIPTION OF EMBODIMENTS

Hereinafter, an embodiment of the present invention will be described in detail with reference to the drawings. As a typical example of the surface light source device of the present invention, a surface light source device suitable for, for example, a backlight of a liquid crystal display device will be described in the following description. Such a surface light source device, i.e., surface light source device 100, can be used as display device 100' in combination with a display member (member to be irradiated) 102, such as a liquid crystal panel, that is irradiated with light from the surface light source device.

(Configurations of Surface Light Source Device and Light Emitting Device)

Figure 1:
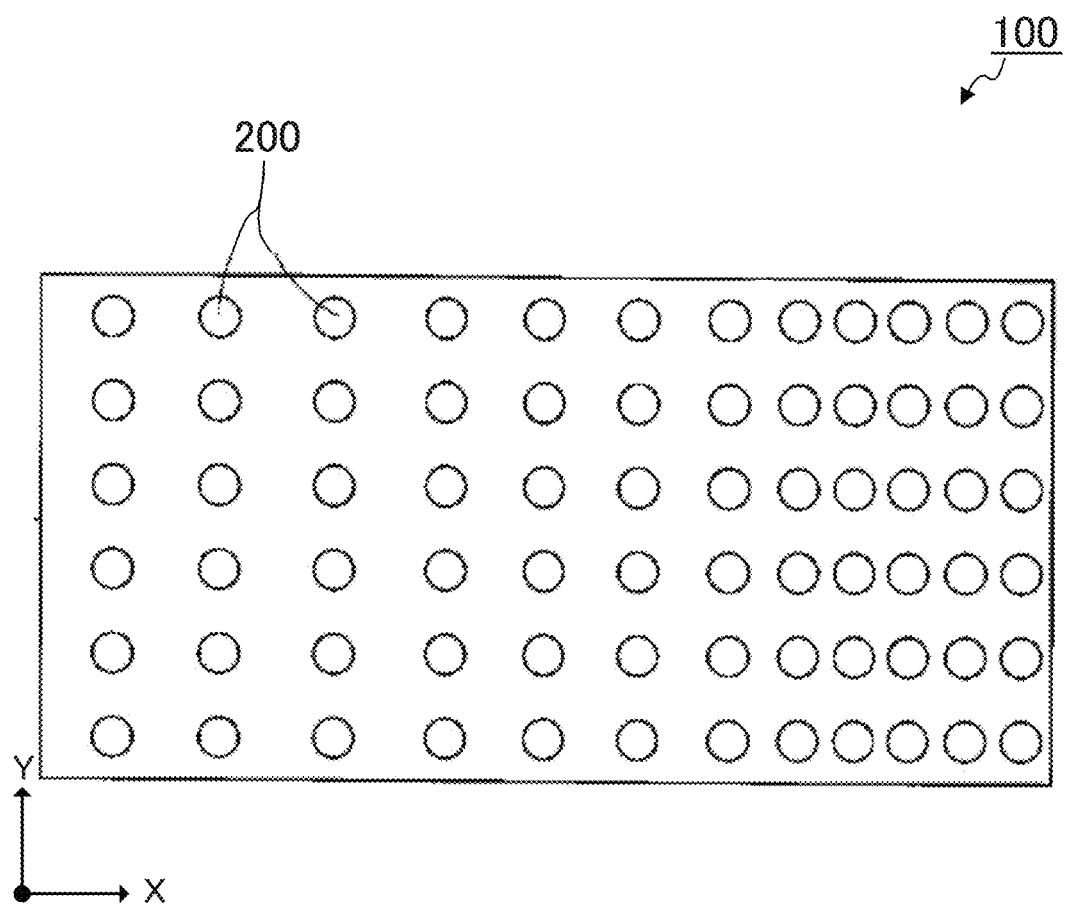
FIG. 1 illustrates a surface light source device including a plurality of light emitting devices disposed on a substrate.
Figure 2A:
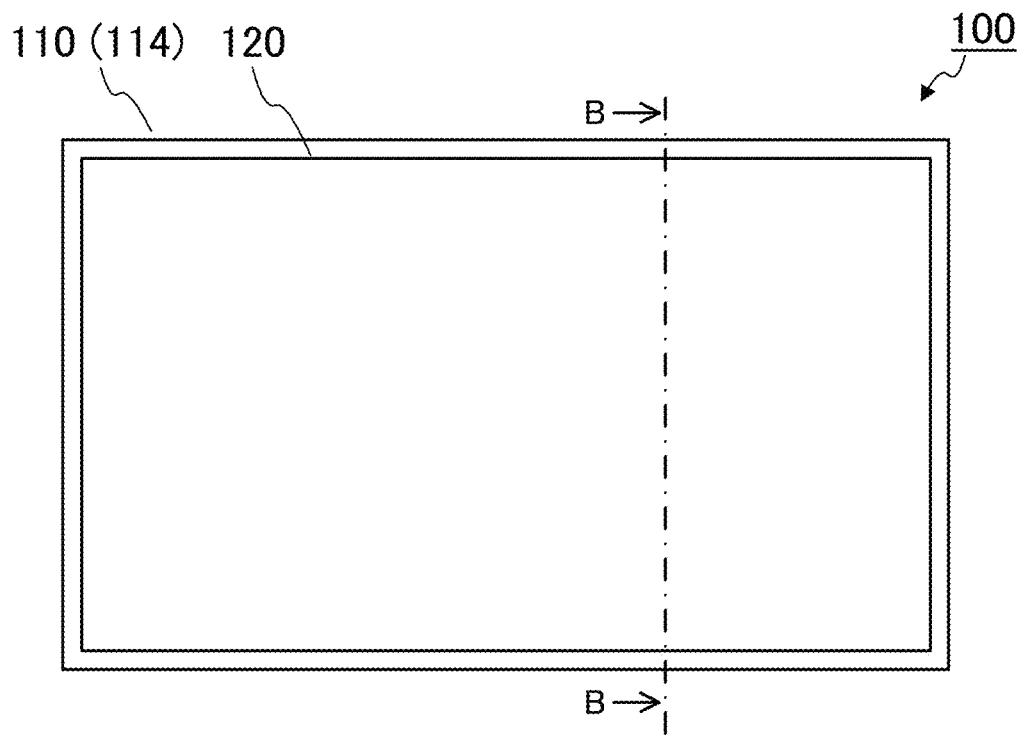
FIGS. 2A and 2B illustrate a configuration of a surface light source device according to an embodiment.
Figure 2B:
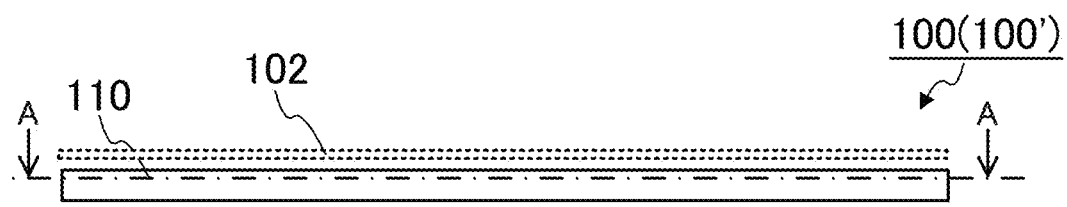
Figure 3A:
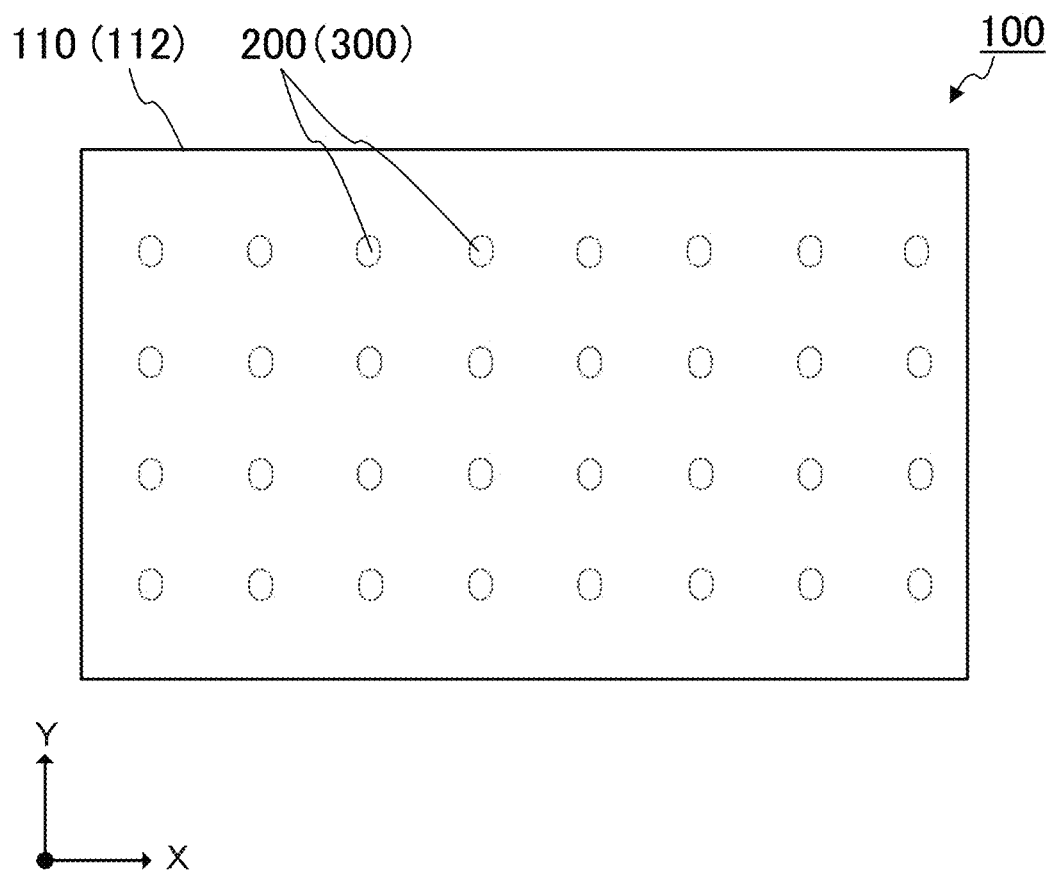
FIGS. 3A and 3B are cross-sectional views illustrating the configuration of the surface light source device according to the embodiment.
Figure 3B:
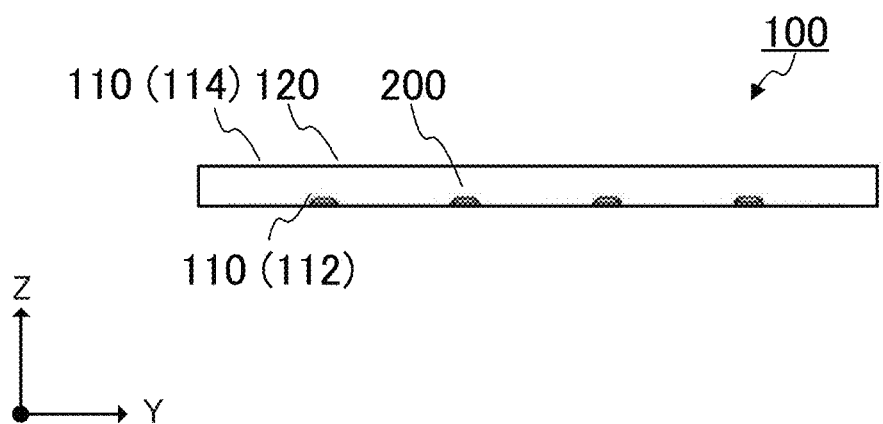
Figure 4:
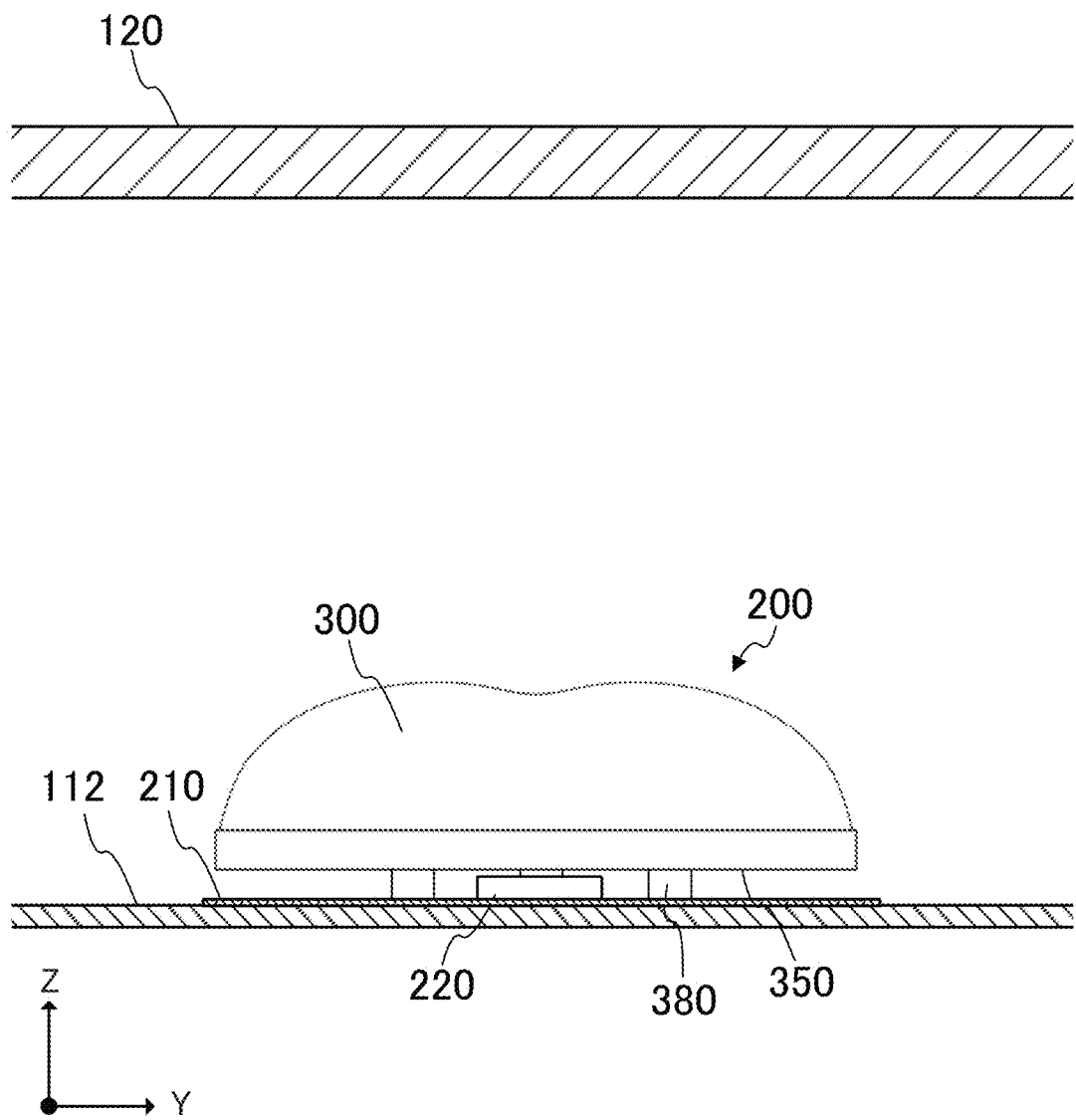
FIG. 4 is a partially enlarged cross-sectional view illustrating an enlarged part of FIG. 3B.

FIGS. 2A to 4 illustrate a configuration of surface light source device 100 according to the embodiment of the present invention. FIG. 2A is a plan view, and FIG. 2B is a front view. FIG. 3A is a cross-sectional view taken along line A-A of FIG. 2B, and FIG. 3B is a cross-sectional view taken along line B-B of FIG. 2A. FIG. 4 is a partially enlarged cross-sectional view illustrating an enlarged part of FIG. 3B.

As shown in FIGS. 2A to 4, surface light source device 100 according to the embodiment includes casing 110, a plurality of light emitting devices 200, and light diffusion plate 120. The plurality of light emitting device 200 are arranged in a matrix on bottom plate 112 of casing 110. The inner surface of bottom plate 112 functions as a diffusive reflection surface. Top plate 114 of casing 110 is provided with a rectangular opening. Light diffusion plate 120 is disposed to close the opening, and functions as a light emitting surface. The light emitting surface may have any size which is, for example, about 400 mm×about 700 mm.

In the present specification, only a region, which closes the opening of top plate 114 (the region functioning as a light emitting surface in surface light source device 100), in light diffusion plate 120 may be referred to as light diffusion plate 120. In describing the positional relationship between light emitting device 200 and a corner of light diffusion plate 120, for example, "corner of light diffusion plate 120" means a corner of the region, which closes the opening of top plate 114 (the region functioning as a light emitting surface in surface light source device 100), in light diffusion plate 120. In describing the positional relationship between light emitting device 200 and an end of light diffusion plate 120, for example, "end of light diffusion plate 120" means an end of the region, which closes the opening of top plate 114 (the region functioning as a light emitting surface in surface light source device 100), in light diffusion plate 120.

Further, in the present specification, a direction along the major axis of an rectangular area in light diffusion plate 120 is referred to as the X-axis direction, and a direction along the minor axis direction of the rectangular area as the Y-axis direction—the rectangular region closes the opening of top plate 114, namely the rectangular region functioning as a light emitting surface in surface light source device 100. A direction orthogonal to the X- and the Y-axis directions is referred to as the Z-axis direction. As will be described below, the X-axis, Y-axis and Z-axis are defined by the shape of emission surface 330 of light flux controlling member 300.

As shown in FIG. 4, each light emitting device 200 is fixed on substrate 210. Each substrate 210 is fixed at a predetermined position on bottom plate 112 of casing 110. Each light emitting device 200 includes light emitting element 220 and light flux controlling member 300.

Light emitting element 220 is a light source of surface light source device 100 and is implemented on substrate 210. Light emitting element 220 is a light emitting diode (LED), such as a white light emitting diode.

Light flux controlling member 300 is a diffusion lens for controlling the distribution of light emitted from light emitting element 220, and is fixed on substrate 210. Light flux controlling member 300 is disposed above light emitting element 220 so that its central axis OA coincides with optical axis OA of light emitting element 220. As described below, the shape of emission surface 330 in the direction perpendicular to central axis CA of light flux controlling member 300 is line-symmetric with respect to the X-axis (minor axis) and Y-axis (major axis). That is, the shape of emission surface 330 is rotationally symmetric (twice symmetric) with respect to the Z-axis. Central axis CA of light flux controlling member 300 corresponds to this Z-axis (see FIGS. 5A, B and C). In addition, "optical axis OA of light emitting element 220" means a central light beam of a stereoscopic emission light flux from light emitting element 220. A gap is formed between substrate 210 having light emitting element 220 implemented thereon and rear surface 350 of light flux controlling member 300 for releasing heat generated from light emitting element 220 to the outside.

Each light flux controlling member 300 is disposed in such a way that (1) the X-axis of light flux controlling member 300 is substantially parallel to the two sides, which face each other, of the four sides of rectangular light diffusion plate 120, and the Y-axis of light flux controlling member 300 is substantially parallel to the other two sides, which face each other, of the four sides of light diffusion plate 120, and (2) the shortest distance from light flux controlling member 300 to a virtual plane orthogonal to the Y-axis passing through the corner is longer than the shortest distance from light flux controlling member 300 to a virtual plane orthogonal to the X-axis passing through the corner (see FIG. 3A).

Light flux controlling member 300 is formed by integral molding. The material of light flux controlling member 300 may be any material that allows light with a desired wavelength to pass therethrough. The material of light flux controlling member 300 is, for example, a light transmissive resin such as polymethylmethacrylate (PMMA), polycarbonate (PC), epoxy resin (EP) or silicone resin, or glass.

Surface light source device 100 according to the present embodiment has its main feature in the configuration of light flux controlling member 300. Light flux controlling member 300 will thus be separately described in detail.

Light diffusion plate 120 is a plate-shaped member having a light diffusing property, and allows light emitted from light emitting device 200 to pass therethrough while diffusing the light. Normally, the size of light diffusion plate 120 is substantially the same as that of the member to be irradiated such as a liquid crystal panel. Light diffusion plate 120 is formed of, for example, a light transmissive resin such as polymethylmethacrylate (PMMA), polycarbonate (PC), polystyrene (PS), or styrene-methylmethacrylate copolymer resin (MS). In order to provide a light diffusing property, minute irregularities are formed in the surface of light diffusion plate 120, or light diffusing members such as beads are dispersed in light diffusion plate 120.

In the present embodiment, light diffusion plate 120 has a rectangular entire shape and also has a rectangular shape for the region, which closes the opening of top plate 114 (the region functioning as a light emitting surface in surface light source device 100), in light diffusion plate 120, but when the region has a rectangular shape, the entire shape may not necessarily be rectangular. In the context of describing the positional relationship between light emitting device 200 and a corner or an end of light diffusion plate 120, "light diffusion plate 120" refers to the region, which closes the opening of top plate 114 (the region functioning as a light emitting surface in surface light source device 100), in light diffusion plate 120, as described above.

In surface light source device 100 according to the present embodiment, light emitted from each light emitting element 220 is expanded by light flux controlling member 300 so as to illuminate a wide range of light diffusion plate 120. The light emitted from each light flux controlling member 300 is further diffused by light diffusion plate 120. Surface light source device 100 according to the present embodiment can thus uniformly illuminate a planar member to be irradiated (for example, a liquid crystal panel).

(Configuration of Light Flux Controlling Member)

Figure 5A:
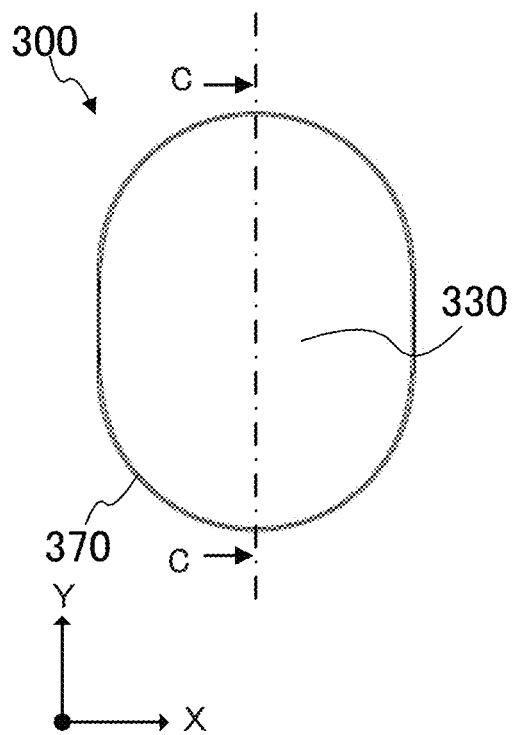
FIGS. 5A to 5D illustrate a configuration of a light flux controlling member in the surface light source device according to the embodiment.
Figure 5B:
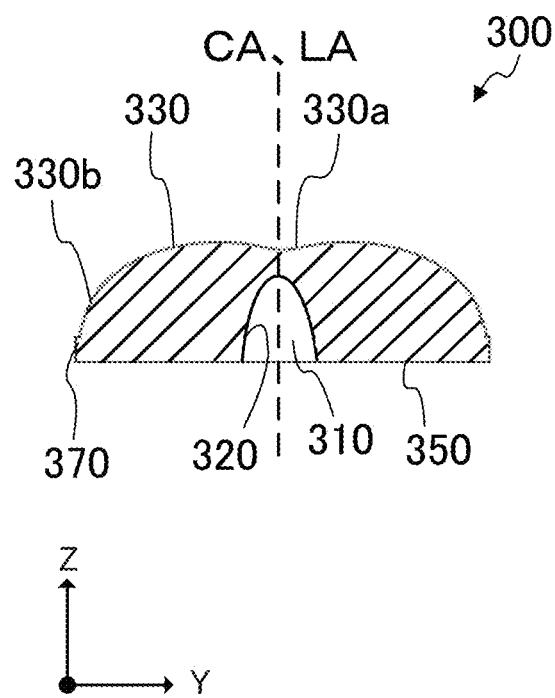
Figure 5C:
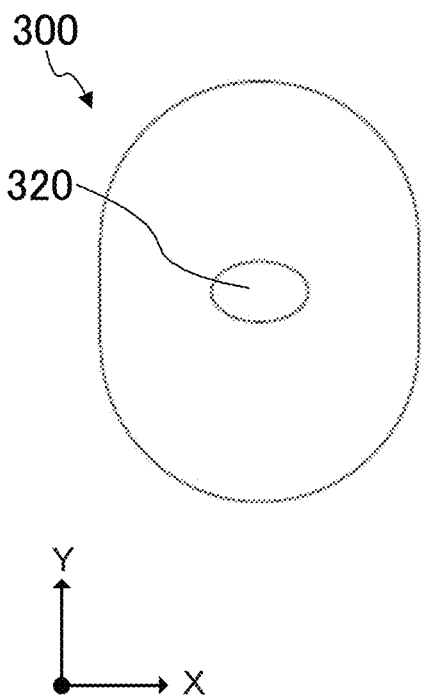
Figure 5D:
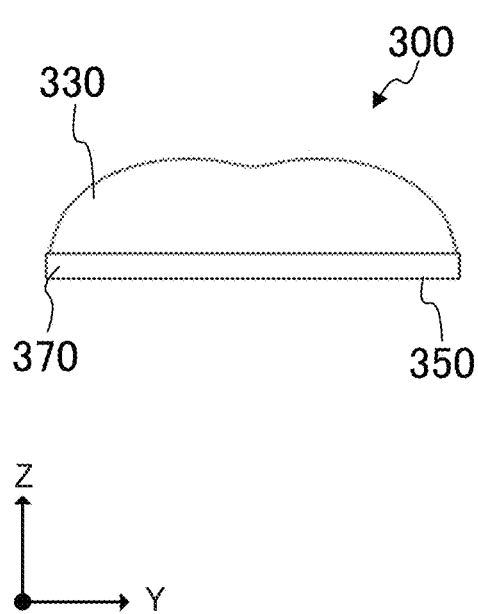

FIGS. 5A to 5D illustrate a configuration of light flux controlling member 300 according to the embodiment. FIG. 5A is a plan view, FIG. 5B is a cross-sectional view taken along line C-C of FIG. 5A, FIG. 5C is a bottom view, and FIG. 5D is a right side view.

As shown in FIGS. 5A to 5D, light flux controlling member 300 includes recess 310, incidence surface 320, emission surface 330, rear surface 350 and flange 370.

Recess 310 is formed in the center portion of the rear side of light flux controlling member 300 (light emitting element 220 side). The inner surface of recess 310 functions as incidence surface 320. Incidence surface 320 allows the majority of the light emitted from light emitting element 220 to enter light flux controlling member 300, while controlling the travelling direction of the light (see FIG. 4). Incidence surface 320 intersects optical axis OA of light emitting element 220.

In the present embodiment, the cross-sectional shape of recess 310 in a direction orthogonal to central axis CA of light flux controlling member 300 is substantially oval with its major axis along the X-axis direction, and its minor axis along the Y-axis direction.

Emission surface 330 is formed on the front side of light flux controlling member 300 (light diffusion plate 120 side) so as to protrude from flange 370. The shape of emission surface 330 in plan view is a substantially elongated circle as shown in FIG. 5A. Emission surface 330 emits the light having entered light flux controlling member 300 to the outside while controlling the travelling direction of the light. Emission surface 330 intersects optical axis OA of light emitting element 220. The cross section of emission surface 330 in the direction orthogonal to central axis CA of light flux controlling member 300 is line-symmetric with respect to the X-axis and the Y-axis orthogonal to the X-axis, and the cross section has the shortest length in the direction along the X-axis and the longest length in the direction along the Y-axis. Here, the "length in the direction along the X-axis" does not necessarily mean the length on the X-axis (length at Y=0), but means the length between the most distant two points on a straight line parallel to the X-axis. Similarly, "the length in the direction along the Y-axis" does not necessarily mean the length on the Y-axis (length at X=0), but means the length between the most distant two points on a straight line parallel to the Y-axis. As shown in FIG. 5B and FIG. 5D, the upper center of light flux controlling member 300 is recessed in the present embodiment. At the top of light flux controlling member 300, the cross section of emission surface 330 in the direction orthogonal to central axis CA thus becomes two planes arranged in islands across the X-axis. In this part, the cross section of emission surface 330 is not located on the X-axis, but the length of the cross section of emission surface 330 along the X-axis is the length of one of the two cross sections (i.e., two planes) arranged in islands, in the direction parallel to the X-axis. In addition, the two cross sections have a gap therebetween on the Y-axis, but the length of the cross section of emission surface 330 in the direction along the Y-axis in this part is the length between the end of one of the cross sections (the end farthest from the other cross section) and the end of the other one of the cross sections (the end farthest from the one cross section) in the direction parallel to the Y-axis. In the present embodiment, the cross-sectional shape of emission surface 330 in the direction orthogonal to central axis CA of light flux controlling member 300 is a substantially elongated circle.

Emission surface 330 includes first emission surface 330a located in a predetermined range around optical axis OA, and second emission surface 330b that connects first emission surface 330a and flange 370 (see FIG. 5B). In the present embodiment, first emission surface 330a is a smoothly curved surface protruding toward the rear side (light emitting element 220 side), but the shape of first emission surface 330a is not limited to this configuration. Second emission surface 330b is a curved surface located around first emission surface 330a. Second emission surface 330b has a shape protruding toward the front side (light diffusion plate 120 side), but the shape of second emission surface 330b is not limited to this configuration.

As described above, the cross-sectional shape of emission surface 330 in the direction orthogonal to central axis CA is a substantially elongated circle in light flux controlling member 300 according to the present embodiment. One of the features of light flux controlling member 300 according to the present embodiment is that a part having the largest curvature in this cross section is in a predetermined position. This feature will thus be separately described in detail.

Rear surface 350 is a flat surface located on the rear side of light flux controlling member 300 and extending radially from the opening edge of recess 310. Rear surface 350 allows light, which is part of the light emitted from light emitting element 220 but has not entered from incidence surface 320, to enter light flux controlling member 300.

Flange 370 is located between the outer periphery of emission surface 330 and the outer periphery of rear surface 350, and protrudes radially outward. Flange 370 has an annular shape. While flange 370 is not an essential component, the provision of flange 370 facilitates handling and alignment of light flux controlling member 300. Flange 370 may have any thickness, which is determined in view of the area required for emission surface 330, the formability of flange 370 and the like.

Light flux controlling member 300 may have a plurality of legs 380 (see FIG. 4). Each leg 380 is, for example, a substantially cylindrical member protruding from rear surface 350. The plurality of legs 380 support light flux controlling member 300 at an appropriate position relative to light emitting element 220.

(Shape of Emission Surface)

In the following, the shape of emission surface 330 of light flux controlling member 300 according to the present embodiment will be described in more detail. For light emitting device 200 disposed closest to the corner of light diffusion plate 120, light flux controlling member 300 according to the present embodiment includes a part having the largest curvature in emission surface 330 on the cross section of emission surface 330—the cross section which passes through the intersection point of emission surface 330 with a light beam emitted from light emission center of light emitting element 220 and reaching the corner of light diffusion plate 120, and which is perpendicular to central axis CA. The part is located closer to the X-axis than the intersection point is.

Figure 6A:
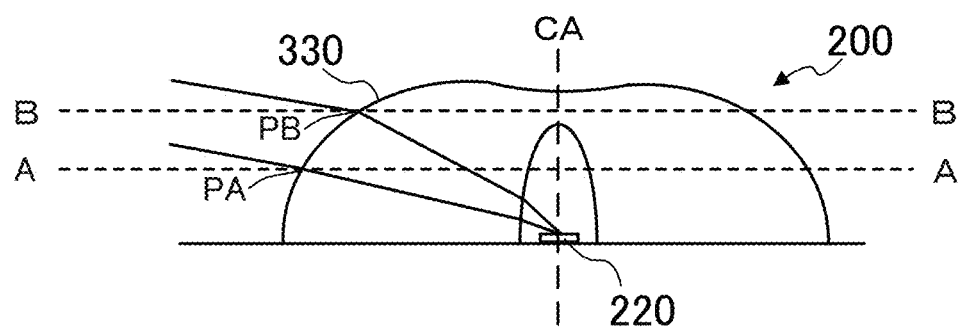
FIGS. 6A to 6E are diagrams for explaining the curvature of the emission surface of the light flux controlling member in the surface light source device according to the embodiment.

FIG. 6A shows positions of cross sections in light emitting device 200 (disposed at the upper right in FIG. 3A) disposed closest to the corner of light diffusion plate 120 (upper right corner in FIG. 2A). The cross sections are perpendicular to central axis CA, and respectively pass through intersections PA and PB of emission surface 330 with light beams, which are emitted from the light emission center of light emitting element 220 and reach the corner of light diffusion plate 120. FIG. 6A shows light flux controlling member 300 viewed along the X-axis direction. As shown in FIG. 6A, the number of light beams emitted from light emission center of light emitting element 220 and reaching the corner of light diffusion plate 120 is two. Herein, the intersection point between the light beam emitted at a greater angle with respect to optical axis OA and emission surface 330 is referred to as intersection point PA, and the intersection point between the light beam emitted at a smaller angle with respect to optical axis OA and emission surface 330 is referred to as intersection point PB.

Figure 6B:
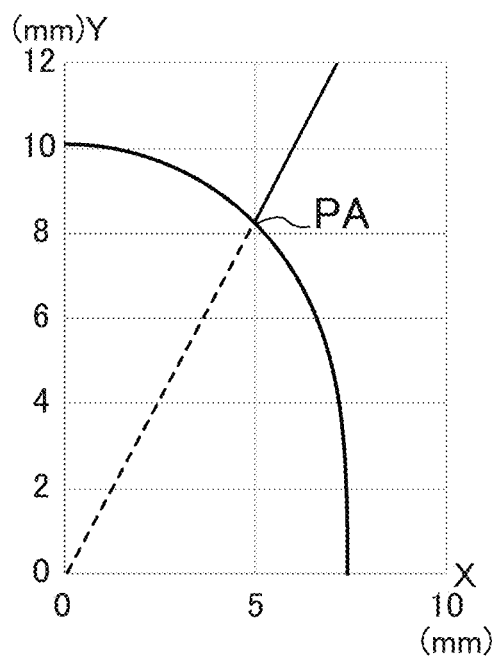
Figure 6C:
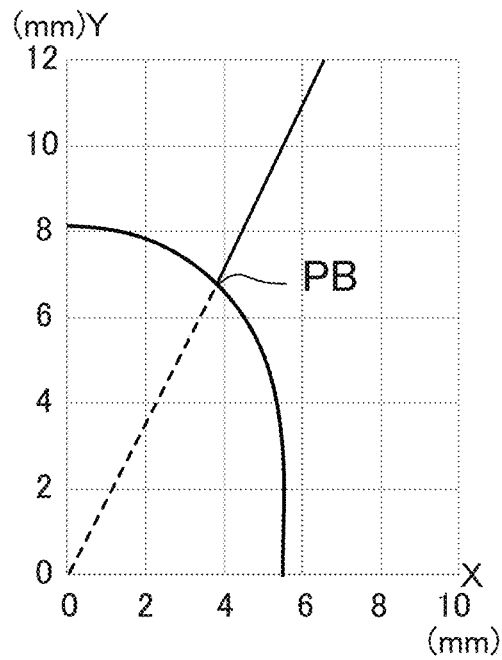

FIG. 6B illustrates a cross section taken along line A-A of FIG. 6A, and FIG. 6C illustrates a cross section taken along line B-B of FIG. 6A. That is, FIGS. 6B and 6C show cross sections of emission surface 330, which are perpendicular to central axis CA, individually passing through intersection points PA and PB of the emission surface with light beams emitted from the light emission center of light emitting element 220 and reaching the corner of light diffusion plate 120. Although the shape of each cross section shows only the first quadrant of the XY plane in FIGS. 6B and 6C, the cross section of the emission surface is line-symmetric with respect to the X-axis and the Y-axis orthogonal to the X-axis, and has the shortest length along the X-axis and the longest length along the Y-axis.

Figure 6D:
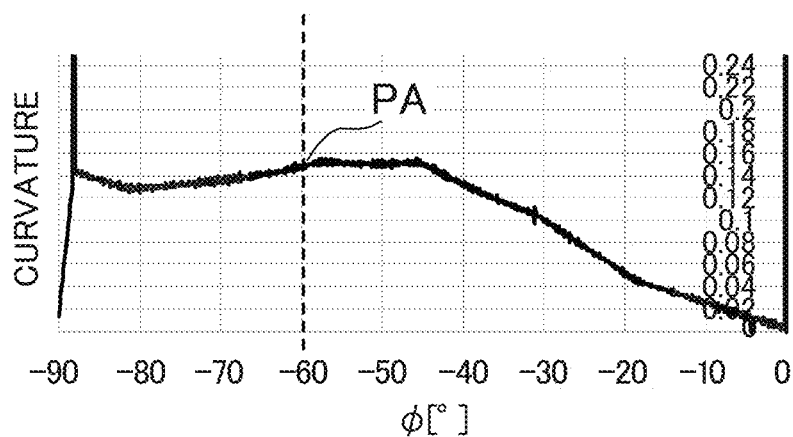
Figure 6E:
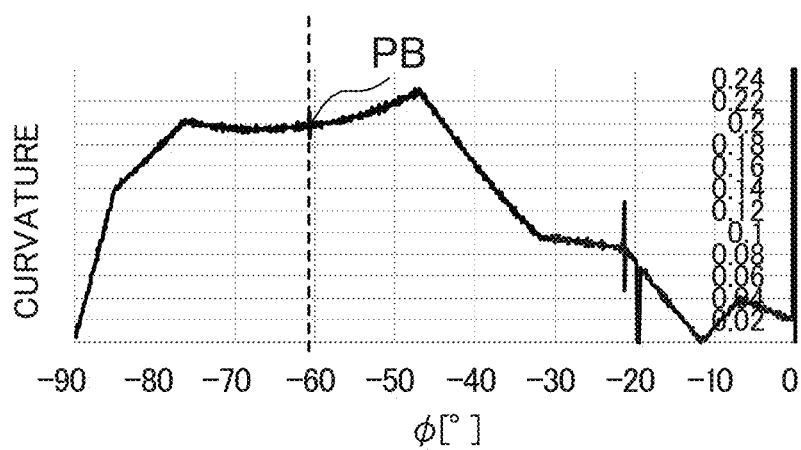

FIGS. 6D and 6E show, when the X-axis direction is set to be 0°, and the Y-axis direction is set to be −90°, and an azimuth angle with respect to the origin (intersection point with central axis CA) is set to be φ in FIGS. 6B and 6C, the curvatures of the cross sections of emission surface 330 at each azimuth angle φ. The broken lines in FIGS. 6B and 6C represent straight lines connecting the origin and points of the emission surface (intersection points PA and PB), from where light beams traveling toward the corner of light diffusion plate 120 are emitted, and the broken lines in FIGS. 6D and 6E show the azimuth angles (φ) of the intersection points PA and PB.

As is apparent from FIGS. 6B, 6C, 6D and 6E, on each of the cross sections individually passing through intersections PA and PB, a part having the largest curvature is located closer (i.e., on the minor axis side relative to the intersection point) to the X-axis than the intersection point PA or PB of the emission surface is. The light beams traveling toward the corner of light diffusion plate 120 is emitted from the intersection points PA and PB. FIGS. 6B, 6C, 6D and 6E are also recognized to show that the cross sections individually passing through intersection points PA and PB each have a part where the curvature is gradually increased toward the X-axis side (minor axis side) from the point, from where the light beam traveling toward the corner of light diffusion plate 120 is emitted, of the emission surface. FIG. 6D shows a large curvature when φ is around −88° or 0°, and FIG. 6E shows a large curvature when φ is around −20° or 0°. FIGS. 6D and 6E show measured values, and thus it can be considered that the above large values indicate outliers due to, for example, the accuracy limitation of a measuring device or the dust on the surface of emission surface. The line of the curvature is actually smooth as shown in 6B and 6C, and no largest part of the curvature is actually near the above values. For evaluating the relationship between the azimuth angle φ and the curvature based on the measured values, such outliers are excluded from the evaluation.

In each of FIGS. 6D and 6E, the part where the curvature shows the largest value, and the part where the curvature gradually increases, are within a region from the intersection point PA or PB to an angle of 20° toward the X-axis side. Although this region is not particularly limited, from the viewpoint of allowing more light to reach the vicinity of a corner of light diffusion plate 120, the part where the curvature shows the largest value, and the part where the curvature gradually increases, are within a region from the point (intersection point PA or PB), from where the light beam traveling toward the corner of light diffusion plate 120 is emitted, to an angle of preferably, for example, 30°, more preferably 20°, toward the X-axis side (see FIGS. 6D and 6E). Further, the point (intersection point PA or PB), from where the light beam traveling toward the corner of light diffusion plate 120 is emitted, the part where the curvature shows the largest value, and the part where the curvature gradually increases are preferably in the range of $-85° \leq \varphi \leq -5°$, and more preferably in the range of $-70° \leq \varphi \leq -40°$ (see FIGS. 6D and 6E).

Figure 9A:
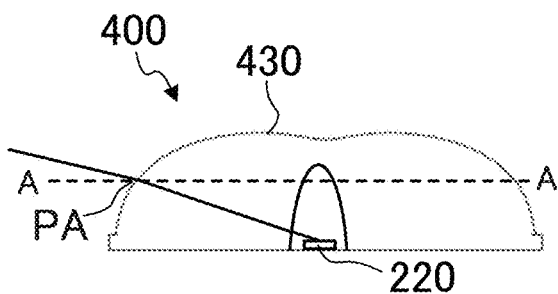
FIGS. 9A to 9F are diagrams for explaining the curvature of respective emission surfaces of the conventional light flux controlling members in surface light source devices.
Figure 9B:
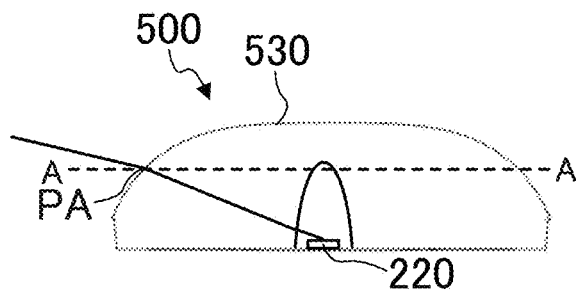

FIGS. 9A and 9B individually show, in the same manner as FIG. 6A, cross sections of emission surfaces of the two light flux controlling members. Each cross section passes through intersection point PA of an emission surface with a light beam and is perpendicular to central axis CA, and the light beam is emitted from the light emission center of light emitting element 220 and reach the corner of light diffusion plate 120.

Figure 7A:
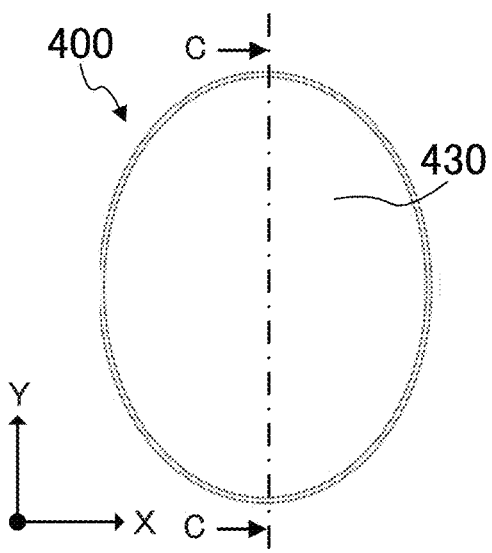
FIGS. 7A to 7F illustrate a configuration of a conventional light flux controlling member.
Figure 7B:
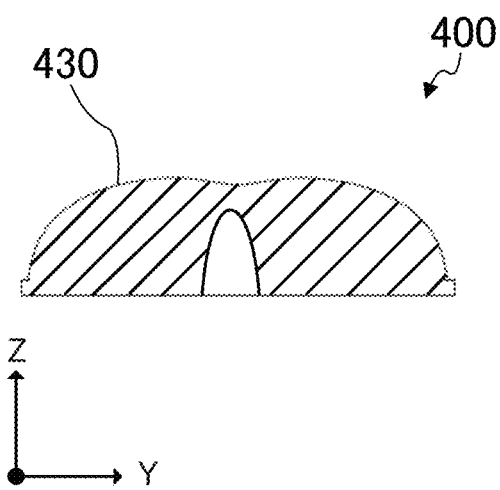
Figure 7C:
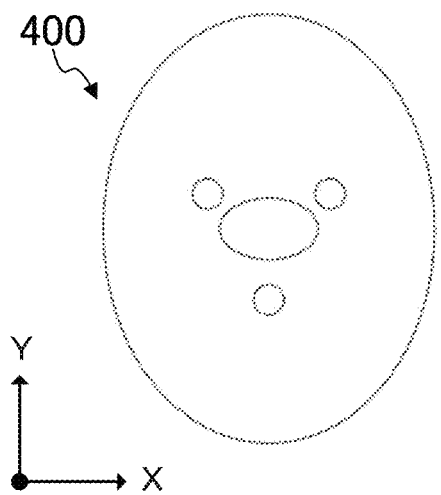
Figure 7D:
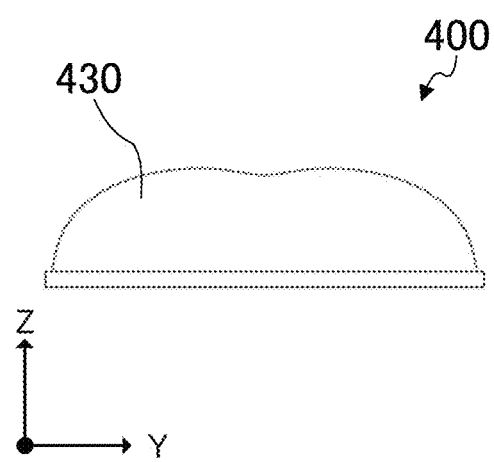
Figure 7E:
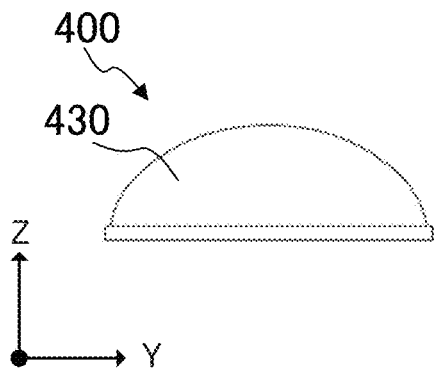
Figure 7F:
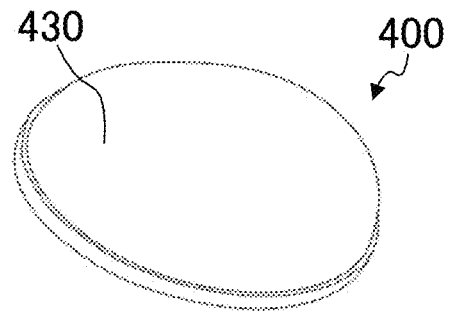

FIGS. 7A to 7F illustrate a configuration of conventional light flux controlling member 400. FIG. 7A is a plan view, FIG. 7B is a cross-sectional view taken along line C-C of FIG. 7A, FIG. 7C is a bottom view, FIG. 7D is a right side view, FIG. 7E is a front view, and FIG. 7F is a perspective view. Conventional light flux controlling member 400 includes emission surface 430 whose shape differs from the shape of emission surface 330 of light flux controlling member 300.

Figure 8A:
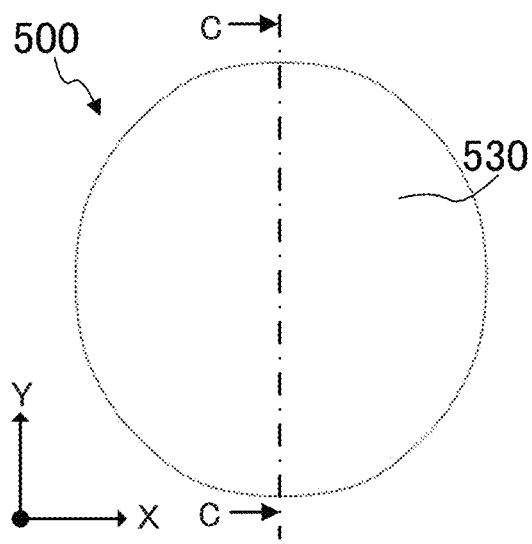
FIGS. 8A to 8F illustrate a configuration of another conventional light flux controlling member.
Figure 8B:
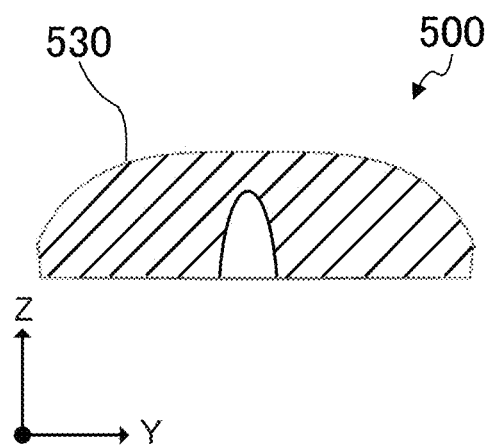
Figure 8C:
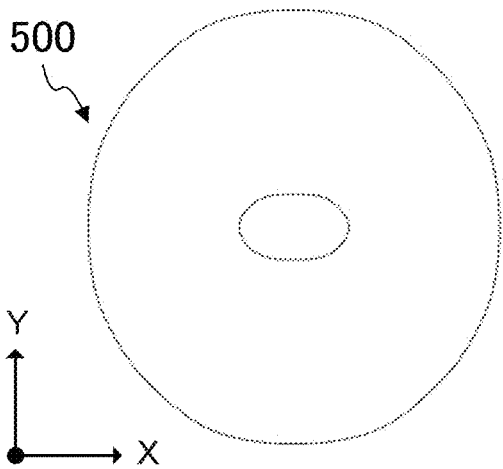
Figure 8D:
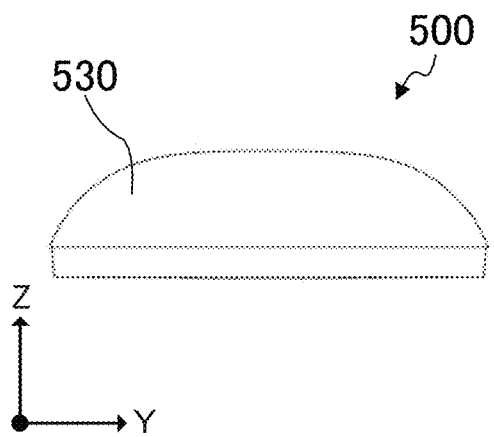
Figure 8E:
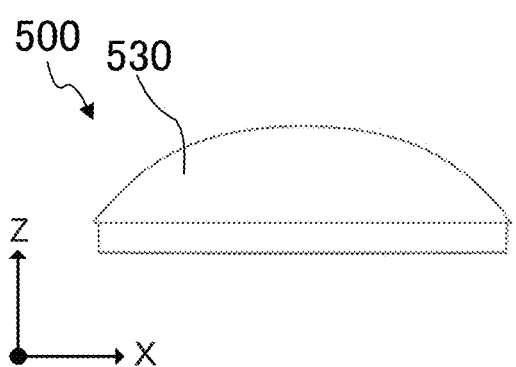
Figure 8F:
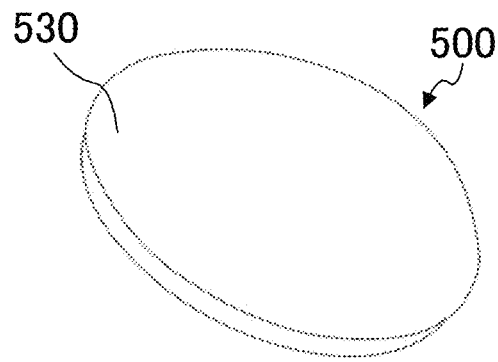

FIGS. 8A to 8F illustrate a configuration of another conventional light flux controlling member 500. FIG. 8A is a plan view, FIG. 8B is a cross-sectional view taken along line C-C of FIG. 8A, FIG. 8C is a bottom view, FIG. 8D is a right side view, FIG. 8E is a front view, and FIG. 8F is a perspective view. Conventional light flux controlling member 500 includes emission surface 530 whose shape differs from the shape of emission surface 330 of light flux controlling member 300.

FIGS. 9A and 9B shows corresponding positions of cross sections of emission surfaces for flux controlling members 400 and 500 in light emitting devices each disposed closest to the corner of light diffusion plate 120 (upper right corner in FIG. 2A). Each cross section is perpendicular to central axis CA, and passes through intersection PA of emission surface 430 or 530 with a light beam, which is emitted from the light emission center of light emitting element 220 and reaches the corner of light diffusion plate 120. FIGS. 9A and 9B show light flux controlling members 400 and 500 viewed along the X-axis direction. As shown in each of FIGS. 9A and 9B, the number of light beams emitted from the light emission center of light emitting element 220 and reaching the corner of light diffusion plate 120 is one.

Figure 9C:
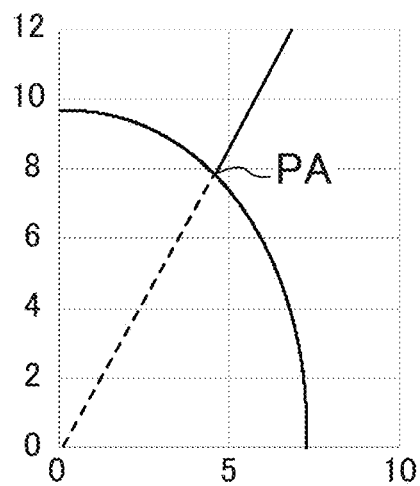
Figure 9D:
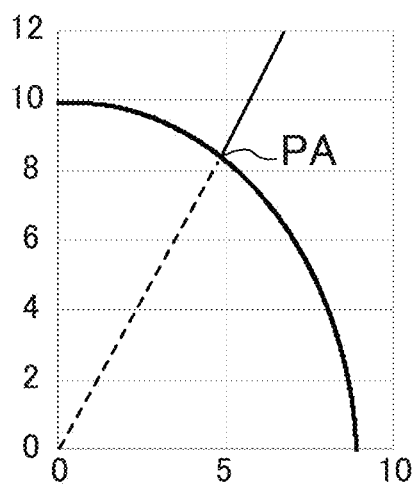

FIG. 9C illustrates a cross section taken along line A-A of FIG. 9A, and FIG. 9D illustrates a cross section taken along line A-A of FIG. 9B. That is, FIGS. 9C and 9D show cross sections, which individually pass through intersection points PA of emission surfaces 430 and 530 with light beams and are perpendicular to central axis CA, of emission surfaces. The light beam is emitted from the light emission center of light emitting element 220 and reach the corner of light diffusion plate 120. Although the shape of each cross section shows only the first quadrant of the XY plane in FIGS. 9B and 9C, the cross section of the emission surface is line-symmetric with respect to the X-axis and the Y-axis orthogonal to the X-axis, and has the shortest length along the X-axis and the longest length along the Y-axis.

Figure 9E:
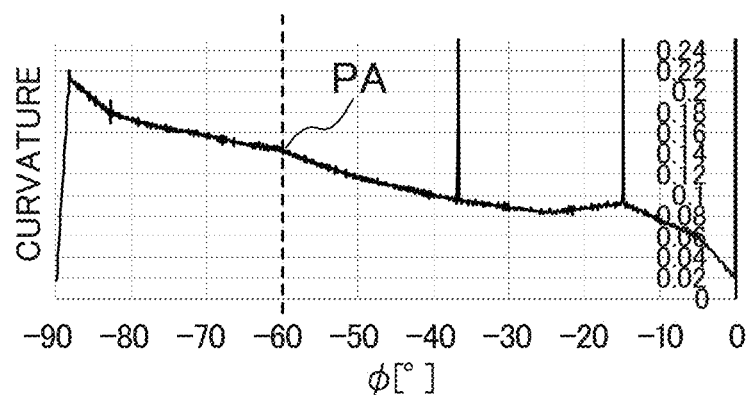
Figure 9F:
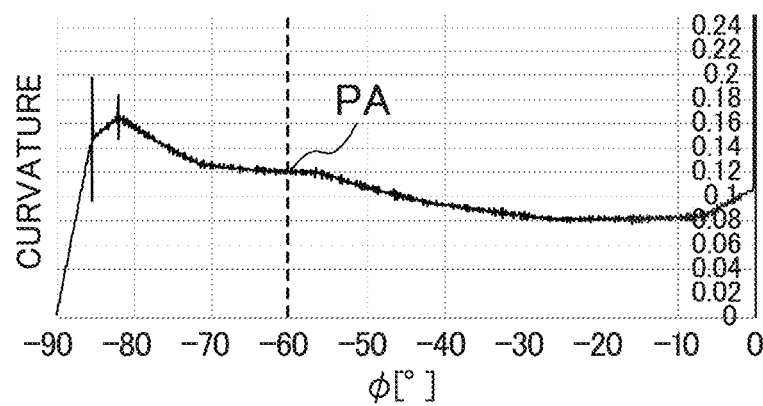

In the same manner as FIG. 6D, FIGS. 9E and 9F respectively show, when the X-axis direction is set to be 0°, and the Y-axis direction is set to be −90°, and an azimuth angle with respect to the origin (intersection point with central axis CA) is set to be φ, the curvatures of the cross sections of emission surface 430 and 530 at each azimuth angle φ for the conventional light flux controlling member shown in FIGS. 9C and 9D.

As is apparent from FIGS. 9E and 9F, in the cross section of each conventional light flux controlling member, a part having the largest curvature is not located closer (i.e., not on the minor axis side relative to the intersection point) to the X-axis than the intersection point PA, from where the light beam traveling toward the corner of light diffusion plate 120 is emitted, of the emission surface is but is located closer to the Y-axis. Large curvatures when φ is around −38°, −15° and 0° in FIG. 9E and large curvatures when φ is around −85° and 0° in FIG. 9F can be considered to indicate outliers due to the accuracy limitation of a measuring device or the dust on the surface of emission surface.

(Light Distribution Characteristics)

As shown FIGS. 6D and 6E, a part having the largest curvature is located closer (i.e., on the minor axis side relative to the intersection point) to the X-axis than the intersection point PA or PB, from where the light beam traveling toward the corner of light diffusion plate 120 is emitted, of the emission surface is. Thus, light beams emitted on the X-axis side (minor axis side) relative to the lines indicated by broken lines in FIGS. 6B and 6C pass through the emission surface where its curvature is higher as shown in FIGS. 6D and 6E. The light beam passing through the emission surface where its curvature is higher is controlled to travel in the direction approaching the line indicated by the solid line in each of FIGS. 6B and 6C (in the direction toward the corner of light diffusion plate 120), so that the light is more likely to reach the vicinity of a corner of light diffusion plate 120.

In each of the conventional light flux controlling members shown in FIGS. 9E and 9F, on the other hand, a part having the largest curvature is not located closer to the X-axis (not on the minor axis side relative to the intersection point) than the intersection point PA is. Thus, a light beam emitted on the X-axis side (minor axis side) relative to the line indicated by broken line in each of FIGS. 9C and 9D is less likely to be controlled to travel in the direction approaching the line indicated by the solid line in each of FIGS. 9C and 9D (in the direction toward the corner of light diffusion plate 120), so that the light is less likely to reach the vicinity of the corner of light diffusion plate 120.

In the above description for FIGS. 6A to 6E, the number of light beams travelling toward a corner of light diffusion plate 120 (see FIG. 6A) is two, but the number of light beams travelling toward the corner of light diffusion plate 120 may be any number such as one, or more than two, i.e., three, four, five or an infinite number.

Figure 10A:
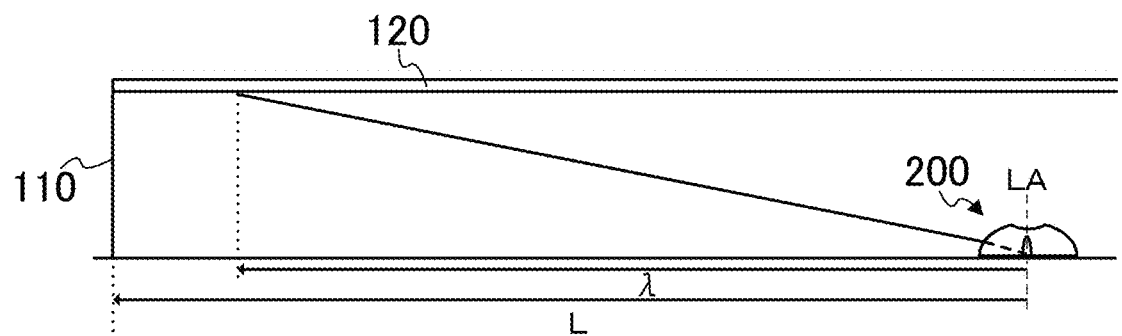
FIGS. 10A to 10C show a light beam emitted from a light emitting element hitting a light diffusion plate.
Figure 10B:
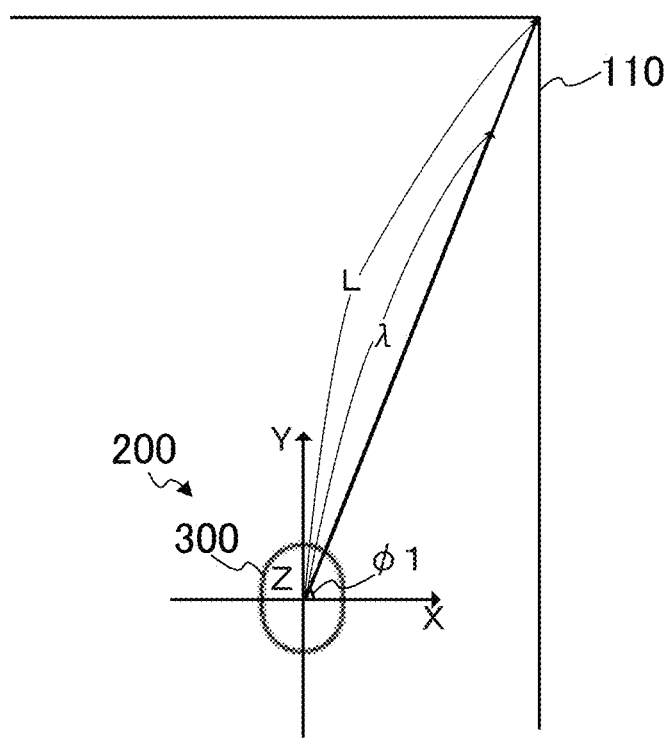
Figure 10C:
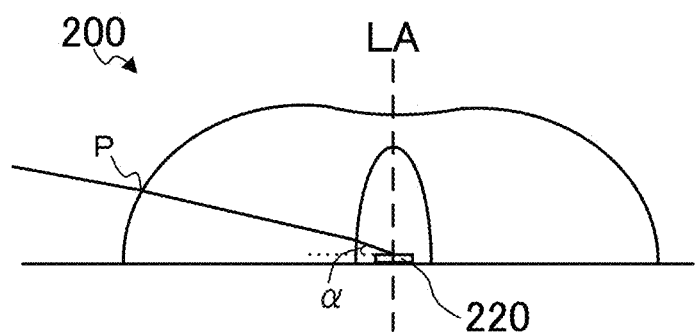

FIGS. 10A, 10B, and 10C show a light beam having emitted from the light emission center of light emitting element 220 and reaching the vicinity of a corner of light diffusion plate 120, for light emitting device 200 disposed closest to the corner of light diffusion plate 120. FIGS. 10A, 10B, and 10C specifically show the light beam, when (1) an azimuth angle of a light beam emitted from the light emission center of light emitting element 220 is set to be φ1 (see FIG. 10B), (2) when a light beam having an angle α with respect to the substrate is emitted (see FIG. 10C), the distance on the XY plane from the point where the light beam reaches light diffusing plate 120 to central axis CA of light flux controlling member 300 is set to be λ, and (3) the distance on the XY plane from a corner of the light diffusion plate to central axis CA of light flux controlling member 300 is set to be L.

Figure 11A:
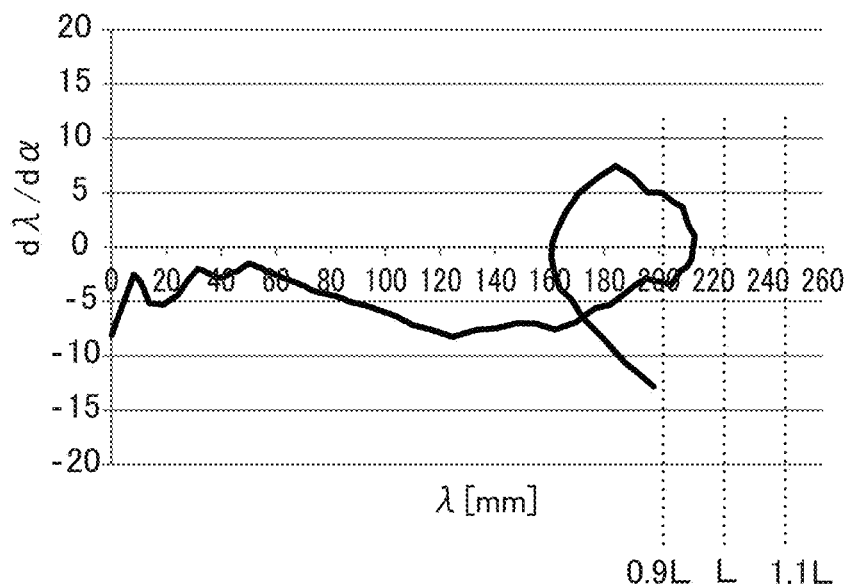
FIGS. 11A and 11B show that the surface light source device according to the embodiment includes an area where $d\lambda/d\alpha$ becomes 0 within a range of 0.9 L to 1.1 L.
Figure 11B:
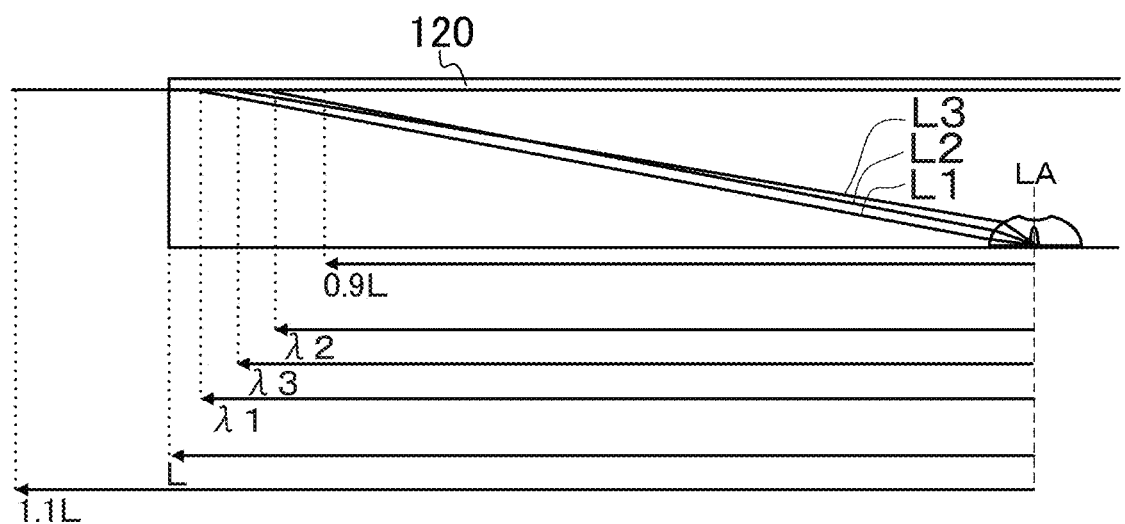

FIGS. 11A and 11B show the relationship between λ and dλ/dα, which represents the change in λ upon changing the angle α of a light beam emitted from light emitting element 220. FIG. 11A specifically shows a graph indicating the relationship between λ and dλ/dα plotted thereon with λ as the abscissa and dλ/dα as the ordinate. FIGS. 11A and 11B show a case where distance L on the XY plane from optical axis LA to the corner of light diffusion plate 120 is 225 mm. As shown in FIG. 11A, dλ/dα takes both positive and negative values and there is an area where dλ/dα becomes 0 in a range of 0.9 L to 1.1 L.

The presence of the area where dλ/dα becomes 0 in the range of 0.9 L to 1.1 L means that dλ/dα is 0 within this range, and that λ does not change when a is changed. This means that light is concentrated in the vicinity of the corner of light diffusion plate 120.

FIG. 11B is a schematic view for explaining the meaning of the presence of an area where dλ/dα becomes 0 in the range of 0.9 L to 1.1 L. FIG. 11B shows the distances (λ1, λ2 and λ3, respectively) of the arrival points of light beams when the angle α is gradually increased in the order of light beams L1, L2, L3.

Normally, when angle α is increased, the arrival point of a light beam becomes closer, so that λ becomes smaller. For example, when L1 and L2 are compared, L2 has a larger angle α than L1, so that light beam L2 reaches closer, and λ2, the distance of the arrival point of the light beam, is smaller than λ1. This corresponds to dλ/dα being a negative value in FIG. 11A. On the other hand, when L2 and L3 are compared, L3 reaches farther than L2, and λ3 is larger than λ2, although L3 has a larger angle α than L2. This corresponds to the sign of dλ/dα being reversed to become positive in FIG. 11A.

Specifically, when λ is around 210 mm, which is in the range of 0.9 L to 1.1 L, dλ/dα takes both positive and negative values and there is an area where dλ/dα becomes 0 in FIG. 11A. That is, |dλ/dα| takes the smallest value around λ of 210 mm, allowing the change in λ to be small even when the angle α is greatly changed, and further the sign of dλ/dα is reversed. This can be considered to be the reason for the concentration of light. As dλ/dα takes both positive and negative values and there is an area where dλ/dα becomes 0 in the range of 0.9 L to 1.1 L, light is concentrated in the vicinity of the corner of light diffusion plate 120.

Figure 12A:
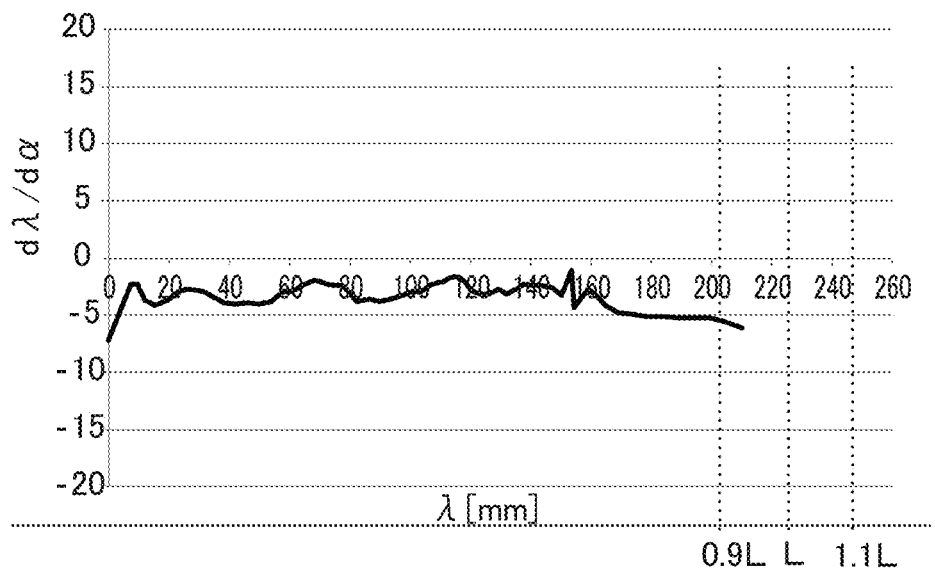
FIGS. 12A and 12B show the values taken by $d\lambda/d\alpha$ in the range of 0.9 L to 1.1 L in the conventional surface light source devices.
Figure 12B:
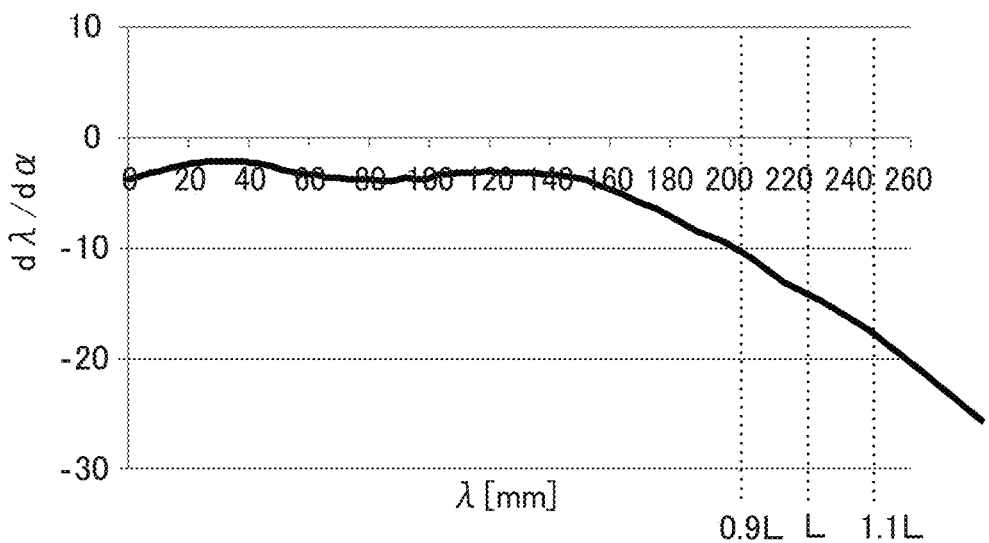

FIGS. 12A and 12B individually show the relationships between λ and dλ/dα, which represent the change in λ upon changing the angle α of a light beam emitted from light emitting element 220, for corresponding light flux controlling members 400 and 500 shown in FIGS. 7A to 7F and FIGS. 8A to 8F.

As shown in FIGS. 12A and 12B, in each conventional light flux controlling member, dλ/dα takes only negative values, and as the angle α is increased, the arrival point of a light beam becomes closer and light is not concentrated in the vicinity of the corner of light diffusion plate 120.

(Effects)

The present invention can provide a surface light source device capable of eliminating insufficiency of light reaching the corners of a light diffusion plate of the surface light source device, and provide a display device including the surface light source device.

INDUSTRIAL APPLICABILITY

The surface light source device of the present invention is applicable to, for example, a backlight of a liquid crystal display device, and a commonly-used illumination device.

REFERENCE SIGNS LIST

100 Surface light source device
110 Casing
112 Bottom plate
114 Top plate
120 Light diffusion plate
200 Light emitting device
210 Substrate
220 Light emitting element
300, 400, 500 Light flux controlling member
310 Recess
320 Incidence surface
330, 430, 530 Emission surface
330a First emission surface
330b Second emission surface
350 Rear surface
370 Flange
380 Leg
CA Central axis
LA Optical axis

The invention claimed is:

1. A surface light source device, comprising:
a substrate;
a plurality of light emitting devices disposed on the substrate; and
a light diffusion plate that allows light from the plurality of light emitting devices to pass through while diffusing the light, the light diffusion plate having a substantially rectangular shape and being disposed so as to face the substrate,
wherein
each of the plurality of light emitting devices includes a light emitting element, and a light flux controlling member that controls distribution of light emitted from the light emitting element,
the light flux controlling member includes an incidence surface disposed so as to face the light emitting element, and an emission surface disposed so as to face the light diffusion plate,
a cross section of the emission surface is line-symmetric with respect to an X-axis and a Y-axis orthogonal to the X-axis, and has a shortest length in a direction along the X-axis and a longest length in a direction along the Y-axis, the cross section being perpendicular to a central axis of the light flux controlling member,
the light flux controlling member of one of the plurality of light emitting devices that is disposed closest to a corner of the light diffusion plate in plan view is disposed in such a way that
two sides of four sides of the light diffusion plate that face each other are substantially parallel to the X-axis, and another two sides of the four sides of the light diffusion plate that face each other are substantially parallel to the Y-axis, and
a shortest distance from the light flux controlling member to a virtual plane which is orthogonal to the Y-axis passing through the corner is longer than a shortest distance from the light flux controlling member to a virtual plane which is orthogonal to the X-axis passing through the corner, and
for the one light emitting device disposed closest to the corner of the light diffusion plate, a part having a largest curvature in the emission surface on the cross section of the emission surface is located closer to the X-axis than an intersection point of a light beam with the emission surface is, the light beam being emitted from a light emission center of the light emitting element and reaching the corner of the light diffusion plate, the cross section passing through the intersection point and being perpendicular to the central axis.

2. The surface light source device according to claim 1, wherein:

an area for the one light emitting device disposed closest to the corner of the light diffusion plate is present under the following conditions such that an azimuth angle upon emission of the light beam, which is emitted from the light emission center of the light emitting element and reaches the corner of the light diffusion plate, is set to be $\varphi 1$, when a light beam having the azimuth angle of $\varphi 1$ and an angle $\alpha$ with respect to the substrate is emitted from the light emission center, a distance on an XY plane from a point to the central axis of the light flux controlling member is set to be $\lambda$, the light beam reaching the light diffusing plate at the point, a distance on the XY plane from the corner of the light diffusion plate to the central axis of the light flux controlling member is set to be L, and a relationship between the $\lambda$ and $d\lambda/d\alpha$ is plotted on a graph with the $\lambda$ as an abscissa and the $d\lambda/d\alpha$ as an ordinate, and the area for the one light emitting device mentioned above is an area where the $d\lambda/d\alpha$ becomes 0 in a range of the $\lambda$ from 0.9 L to 1.1 L.

3. A display device, comprising:

the surface light source device according to claim 1; and a display member to be irradiated with light emitted from the surface light source device.

* * * * *